(12) United States Patent
Whitney et al.

(10) Patent No.: US 8,437,938 B2
(45) Date of Patent: May 7, 2013

(54) AXLE TORQUE BASED CRUISE CONTROL

(75) Inventors: Christopher E. Whitney, Highland, MI (US); Vivek Mehta, Bloomfield Hills, MI (US); Barbara A. Shuler, Brighton, MI (US); Patrick J. O'Leary, Clinton Township, MI (US); Jun Lu, Novi, MI (US)

(73) Assignee: GM Global Technology Operations LLC

( * ) Notice: Subject to any disclaimer, the term of this patent is extended or adjusted under 35 U.S.C. 154(b) by 939 days.

(21) Appl. No.: 12/050,454

(22) Filed: Mar. 18, 2008

(65) Prior Publication Data
US 2009/0182478 A1 Jul. 16, 2009

Related U.S. Application Data

(60) Provisional application No. 61/021,112, filed on Jan. 15, 2008.

(51) Int. Cl.
*G06F 7/00* (2006.01)
(52) U.S. Cl.
USPC ............. 701/93; 123/342; 123/349; 123/370; 123/406.23; 123/406.46
(58) Field of Classification Search .............. 701/93, 701/99; 477/175; 123/342, 349, 370, 406.23, 123/406.46; 180/65.1–65.29, 170, 178, 179
See application file for complete search history.

(56) References Cited

U.S. PATENT DOCUMENTS

| | | | |
|---|---|---|---|
| 5,019,989 A | 5/1991 | Ueda et al. | |
| 5,073,865 A | 12/1991 | Togai et al. | |
| 5,272,939 A | 12/1993 | Markyvech et al. | |
| 5,573,476 A | 11/1996 | Minowa et al. | |
| 5,625,558 A | 4/1997 | Togai et al. | |
| 5,772,555 A | 6/1998 | Minowa et al. | |
| 5,776,030 A | 7/1998 | Minowa et al. | |
| 5,779,594 A | 7/1998 | Minowa et al. | |
| 5,792,021 A | 8/1998 | Minowa et al. | |
| 6,090,011 A | 7/2000 | Minowa et al. | |
| 6,466,851 B2 | 10/2002 | Kato et al. | |
| 7,704,185 B2 | 4/2010 | Babcock et al. | |
| 7,801,658 B2 | 9/2010 | Ohshima | |
| 2001/0056320 A1 | 12/2001 | Kato et al. | |
| 2002/0143455 A1* | 10/2002 | Bidner et al. | 701/69 |
| 2003/0097215 A1 | 5/2003 | Riedle et al. | |

(Continued)

FOREIGN PATENT DOCUMENTS
CN 1088520 A 6/1994
CN 1923557 A 3/2007
(Continued)

OTHER PUBLICATIONS

U.S. Appl. No. 11/934,234, filed Nov. 2, 2007, Robert Simon.

*Primary Examiner* — John Q Nguyen
*Assistant Examiner* — Rodney P King

(57) ABSTRACT

An axle torque control system includes an axle torque request module that receives an axle torque request and that selectively outputs the axle torque request. An axle torque conversion module receives the axle torque request and converts the axle torque request to an engine torque request. A rate limit module receives the engine torque request and a pedal engine torque request and selectively adjusts the engine torque request based on the pedal engine torque request.

13 Claims, 5 Drawing Sheets

U.S. PATENT DOCUMENTS

| | | |
|---|---|---|
| 2004/0034460 A1 | 2/2004 | Folkerts et al. |
| 2004/0048718 A1* | 3/2004 | Tashiro .................. 477/175 |
| 2004/0129251 A1* | 7/2004 | Kang et al. ............... 123/396 |
| 2005/0240333 A1* | 10/2005 | Bauerle et al. ............ 701/93 |
| 2005/0278106 A1* | 12/2005 | Simon et al. .............. 701/70 |
| 2006/0111212 A9* | 5/2006 | Ai et al. ................... 475/5 |
| 2006/0173602 A1 | 8/2006 | Graf et al. |
| 2007/0067087 A1 | 3/2007 | Ohshima |

FOREIGN PATENT DOCUMENTS

| | | |
|---|---|---|
| CN | 101450629 A | 6/2009 |
| DE | 102006000431 | 3/2007 |
| DE | 102008039574 | 6/2009 |
| EP | 0578399 A2 | 1/1994 |
| IN | 1495/KOU2008 | 1/2008 |
| JP | 2003048461 | 2/2003 |

* cited by examiner

AXLE TORQUE BASED CRUISE CONTROL

CROSS-REFERENCE TO RELATED APPLICATIONS

This application claims the benefit of U.S. Provisional Application No. 61/021,112, filed on Jan. 15, 2008. This application relates to U.S. patent application Ser. No. 11/934,234, filed on Nov. 2, 2007. The disclosures of the above applications are incorporated herein by reference in its entirety.

FIELD

The present disclosure relates to coordinating torque requests between a plurality of torque requesting modules including a cruise control torque request, and in particular to determining the cruise control torque request.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Powertrain control systems include a plurality of modules that require a certain amount of engine torque to operate properly. For example, an automatic transmission control module may need to momentarily reduce torque moment prior to engaging an air conditioning compressor clutch. The engine torque increase helps maintain constant engine speed when the compressor clutch engages, particularly when the engine is idling.

Conventionally, these various modules affect torque actuators directly. For example, the automatic transmission control module may retard spark advance to the engine to reduce the engine torque during the shift. Similarly, the air conditioning clutch control module may increase the spark advance to increase the engine torque prior to engaging the compressor clutch.

As vehicle powertrain systems include more modules and more actuators that affect torque, powertrain architecture may become cumbersome to maintain and undesirably difficult to troubleshoot. For example, hybrid vehicles include an engine and an electric motor that provide torque. Integrating the hybrid vehicle powertrain to existing torque-modifying modules can be undesirably cumbersome.

SUMMARY

An axle torque control system includes an axle torque request module that receives an axle torque request and that selectively outputs the axle torque request. An axle torque conversion module receives the axle torque request and converts the axle torque request to an engine torque request. A rate limit module receives the engine torque request and a pedal engine torque request and selectively adjusts the engine torque request based on the pedal engine torque request.

A method for operating an axle torque control system includes receiving an axle torque request, selectively outputting the axle torque request, converting the axle torque request to an engine torque request, and selectively adjusting the engine torque request based on a pedal engine torque request.

In other features, the systems and methods described above are implemented by a computer program executed by one or more processors. The computer program can reside on a computer readable medium such as but not limited to memory, non-volatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
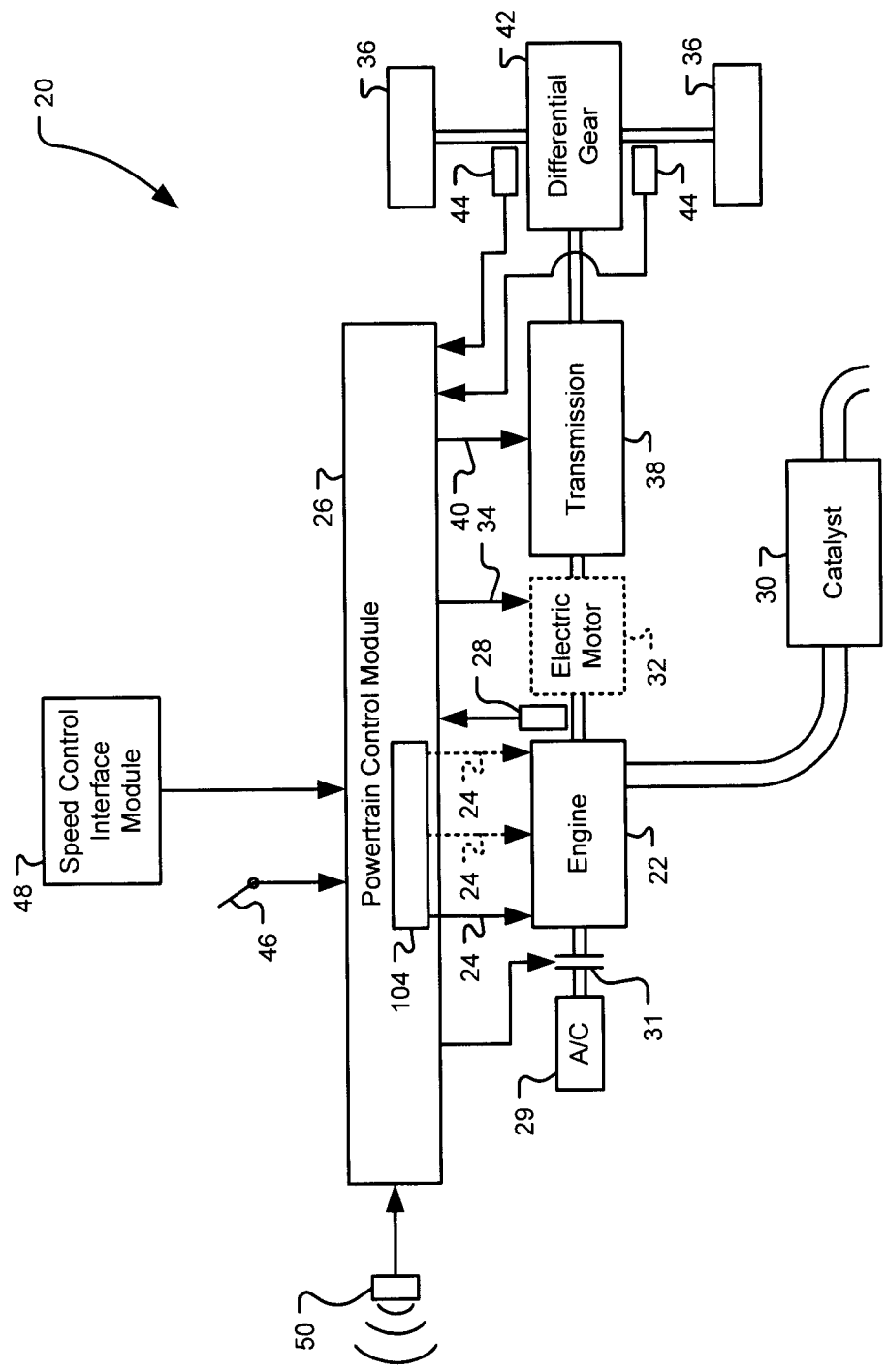
FIG. 1 is a functional block diagram of a vehicle powertrain according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a functional block diagram is shown of a vehicle powertrain 20. Powertrain 20 includes an internal combustion engine 22 that develops torque. The amount of torque is established by one or more actuators 24 that control at least one of fuel, ignition, residual exhaust gas or exhaust recirculation (EGR), number of cylinders firing, and air flow, to engine 22 in accordance with commands from a powertrain control module (PCM) 26. It should be appreciated that engine 22 may be a diesel engine, in which case ignition and air flow are not controlled by PCM 26; however, the fuel amount, injection timing, residual exhaust gas or EGR, and turbo boost could be controlled to control the amount of torque. For example, EGR and boost control the air flow indirectly by displacing air with exhaust gas in a cylinder charge. A crankshaft position sensor 28 generates a signal that indicates a speed of engine 22. Exhaust from engine 22 passes through a catalyst 30. Torque from engine 22 can be used for driving accessory loads. An air conditioning compressor 29 is an example of an accessory load. PCM 26 can employ a compressor clutch 31 to selectively couple and decouple air conditioning compressor 29 from the engine torque. Other examples of accessory loads include an alternator, a power steering pump, an air pump, and the like.

Powertrain 20 may also include an electric motor 32 that provides torque in accordance with a torque command 34. The torque of electric motor 32 can be combined with the torque of engine 22 to provide power for powertrain 20. While electric motor 32 is shown coupled in series with the torque output of engine 22, it should be appreciated that other configurations are also contemplated to be within the scope of this description. For example, electric motor 32 may be implemented as one or more electric motors that provide torque directly to wheels 36 instead of passing through a transmission 38.

The combined torque of engine 22 and electric motor 32 is applied to an input of transmission 38. Transmission 38 may be an automatic transmission that switches gears in accordance with a gear change command 40 from PCM 26. An output shaft of transmission 38 is coupled to an input of a differential gear 42. Differential gear 42 drives axles and wheels 36. Wheel speed sensors 44 generate signals that indicate a rotation speed of their respective wheels 36.

PCM 26 receives an accelerator pedal position signal from a pedal position sensor 46. PCM 26 also receives a set speed signal from a cruise or speed control interface module 48. An adaptive cruise control sensor 50 senses vehicles or other obstacles that are in a driving path and generates a signal that indicates a distance to the obstacles. The signal can be used to adjust a set speed that is provided via speed control interface module 48.

Figure 2A:
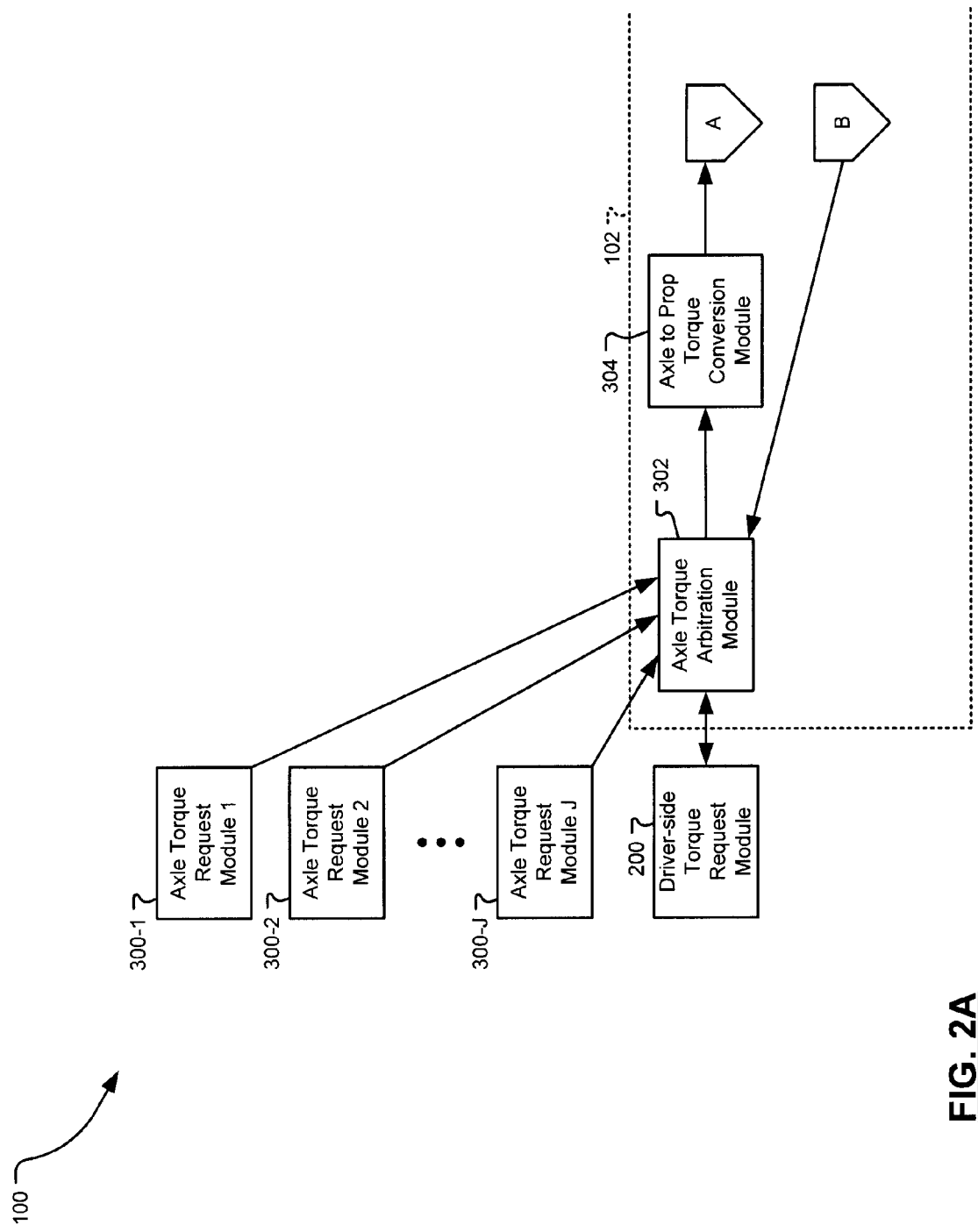
FIGS. 2A and 2B are a functional block diagram of a coordinated torque control system for the vehicle powertrain according to the present disclosure.
Figure 2B:
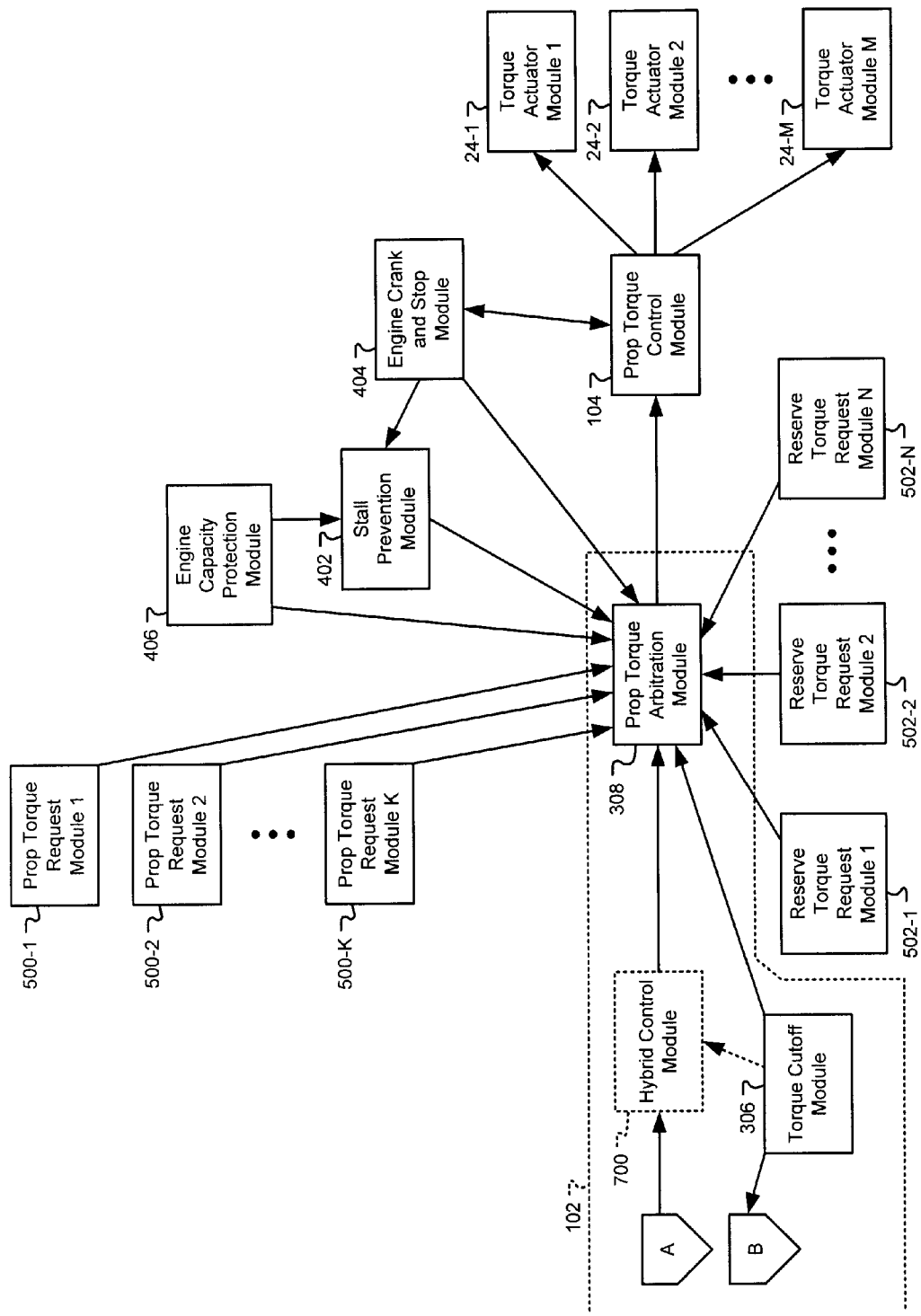

Referring now FIGS. 2A and 2B, a functional block diagram is shown of a coordinated torque control system 100. Coordinated torque control system 100 can be implemented with PCM 26. FIGS. 2A and 2B join together to depict the complete functional block diagram. A first connector label "A" on FIG. 2A overlays a second connector label "A" on FIG. 2B. A first connector label "B" on FIG. 2A overlays a second connector label "B" on FIG. 2B. FIGS. 2A and 2B are collectively referred to as FIG. 2.

Coordinated torque control system 100 employs a torque request backbone module 102 that determines a propulsion torque (i.e. a torque at an input shaft to the transmission, which may include, but is not limited to, crankshaft, flywheel, brake torque, and/or a sum of engine and electric motor torque) demand and communicates the propulsion torque demand to a propulsion torque control module 104. Torque request backbone module 102 determines the propulsion torque demand based on inputs from a plurality of torque requesting modules that are described below in more detail. The torque requesting modules include modules that want to affect one or more of actuators 24 to affect the engine torque. The propulsion torque demand represents the torque needed from engine 22 in order to satisfy the needs of the torque requesting modules such that they can carry out their respective control strategies.

Propulsion torque control module 104 controls one or more of actuators 24-1, ..., 24-M, i.e. actuators 24, based on the net propulsion torque demand. Actuators 24 affect the engine torque. Examples of actuators 24 include an ignition module that delivers an ignition spark to the engine at a specified ignition timing, a fuel injection module that delivers a specified amount of fuel to the engine at a specified time, an electronic throttle control module that moves a throttle valve to a specified opening, and the like.

Each torque requesting module is categorized as either an axle torque requesting module or a propulsion torque requesting module. Axle torque requesting modules control at least one of vehicle speed and vehicle traction with the road surface. Propulsion torque requesting modules control the output torque of the engine and electric motor 32. The axle torque requesting modules are shown in FIG. 2A and will now be described in more detail.

A driver-side torque request module 200 generates a driver torque request based on various driver-side input signals 108, including, but not limited to, cruise control input signals and a pedal position signal. The driver torque request represents the axle torque needed to accelerate the vehicle in accordance with at least one of the driver-side input signals 108, engine speed signal 28, and vehicle speed signal 44.

Other axle torque requesting modules are represented by axle torque request modules 300-1, ..., 300-J, referred to collectively as axle torque request modules 300. A first example of an axle torque request module 300 is a traction/drag control module. The traction/drag control module determines axle torque changes needed to control positive wheel slip and negative wheel slip. Positive wheel slip refers to slip between a vehicle tire and the road surface due to excessive powertrain torque during acceleration. Negative wheel slip refers to slip between the vehicle tire and the road surface due to excessive braking axle torque during deceleration. The slip can be detected based on the signals from wheel speed sensors 44.

A second example of an axle torque request module 300 is a vehicle over-speed protection module. The vehicle over-speed protection module determines a maximum axle torque limit in order to keep the vehicle speed below a predetermined speed limit.

A third example of an axle torque request module 300 is a brake torque management module. The brake torque management module determines a maximum axle torque when the vehicle brakes are applied. The maximum axle torque prevents the axle torque from overcoming the brake torque of the vehicle brakes.

A fourth example of an axle torque request module 300 is a stability control module. The stability control module generates axle torque requests based on a yaw rate of the vehicle. A stability control module may be included in an electronic stability control system, such as the StabiliTrak system sold by General Motors.

Torque control backbone module 102 includes an axle torque arbitration module 302 that receives the various torque requests and/or limits from driver-side torque request module 200, axle torque request modules 300, and a torque cutoff control module 306 (shown in FIG. 2B). Torque cutoff control module 306 is described further below. Axle torque arbitration module 302 generates a net axle torque request based on the torque requests and/or limits and communicates the net axle torque request to an axle-to-propulsion (i.e. axle torque to engine torque) torque conversion module 304. The axle-to-propulsion torque conversion module 304 converts the net axle torque request to a corresponding propulsion torque request based on at least one of the gear ratios in the axle differential gear 42, diameter of wheels 36, a gear ratio of transmission 38, and torque converter gain. The axle-to-propulsion torque conversion module 304 communicates the corresponding propulsion torque request to a propulsion torque arbitration module 308 that is included in torque control backbone 102.

Discussion will now move to the various propulsion torque requesting modules which are shown in FIG. 2B. A stall prevention module 402 determines a minimum torque needed to keep engine 22 running. Stall prevention module 402 may increase the minimum torque based on input from at least one of an engine crank and stop module 404 and an engine capacity protection module 406. Engine crank and stop module 404 increases the minimum torque request based on whether the engine is a new or green engine. A green requires a greater fuel injection pulse width to purge air from the fuel system when the vehicle is first assembled. To compensate for the increased fuel injection pulse width, engine crank and stop module 404 may also communicate with propulsion torque control module 104 so that it may retard the ignition timing and maintain the engine torque constant despite the increased fuel injector pulse width. Engine capacity protection module 406 provides a maximum torque limit for engine 22 based on mechanical limitations of powertrain 20. Examples of limitations include maximum torque limit of transmission 38, a maximum temperature limit of catalyst 30, and the like.

Propulsion torque arbitration module 308 also receives propulsion torque requests from one or more other propulsion torque request modules 500-1, . . . , 500-K, referred to collectively as propulsion torque request modules 500. An example of a propulsion torque request module 500 includes a transmission torque request module that generates a torque request to reduce the engine torque during transmission shifts. Other propulsion torque request modules 500 can include at least one of an engine over-speed protection module and an engine idle speed control module. The engine over-speed protection module determines a propulsion torque limit to prevent the engine speed or RPM from exceeding a predetermined engine speed. The engine speed can be determined based on the signal from crankshaft position sensor 28. The engine idle speed control module determines the propulsion torque needed to maintain engine 22 at a predetermined idle speed during coasting or at idle with transmission in 38 in drive or neutral.

Propulsion torque arbitration module 308 also receives reserve torque requests from one or more reserve torque request modules 502-1, . . . , 502-N, referred to collectively as reserve torque request modules 502. Reserve torque refers to torque that will be needed from engine 22 in the future. A first example of a reserve torque request module 502 is an air conditioning compressor torque compensation module. The air conditioning compressor torque compensation module requests a reserve torque so that the engine speed remains fairly constant when compressor clutch 31 engages and disengages.

A second example of a reserve torque request module 502 is a catalyst light-off module. When the engine is started cold the catalyst light-off module requests that the engine spark be retarded to increase the exhaust gas temperature and thereby heat catalyst 30 to its conversion temperature. To compensate for the torque loss that is caused by the retarded spark the catalyst light-off module can also request that the throttle opening be increased while the spark is retarded.

A third example of a reserve torque request module 502 is an intrusive diagnostic module. An intrusive diagnostic, such as an idle catalyst monitor, needs to change the air/fuel ratio of the engine to perform a diagnostic module. The intrusive diagnostic module therefore requests reserve torque to compensate for the torque effect of a diagnostic procedure that is about to execute.

In some situations the propulsion torque needs to be minimized by momentarily turning off fuel and/or spark to the engine. Torque cutoff module 306 generates the torque requests for these situations, which can include at least one of a clutch fuel cutoff and a deceleration fuel cutoff. A clutch fuel cutoff occurs when the vehicle is equipped with a manual transmission and the vehicle operator disengages the clutch. The clutch fuel cutoff prevents the engine speed from flaring beyond a predetermined speed when the clutch disengages and removes a load from the engine. The deceleration fuel cutoff occurs when the vehicle is coasting above a predetermined speed. The deceleration fuel cutoff helps increase engine braking. Deceleration fuel cutoffs are also communicated to axle torque arbitration module 302.

Propulsion torque arbitration module 308 generates a total requested propulsion torque based on the torque requests and/or limits from the various propulsion torque request modules and the axle torque arbitration module. Propulsion torque arbitration module 308 communicates the total requested propulsion torque to propulsion torque control module 104.

Torque control backbone 102 may also be configured to use with a hybrid electric vehicle. A hybrid electric vehicle includes engine 22 and electric motor 32, which cooperate to propel the vehicle. In a hybrid electric vehicle, the total axle torque request from axle torque arbitration module 302 is communicated to a hybrid control module 700. Hybrid control module 700 determines how much propulsion torque will be provided by electric motor 32 and how much will be provided by engine 22. Hybrid control module 700 communicates the engine's share of the propulsion torque to propulsion torque arbitration module 308. The electric motor's share of the propulsion torque is communicated to electric motor 32 via torque command 34. Axle to propulsion torque conversion module 304 may be combined with hybrid control module 700. Also, torque cutoff module 306 may communicate deceleration fuel cutoff torque requests to hybrid control module 700 instead of axle torque arbitration module 302.

As described above with respect to FIGS. 2A and 2B, torque requests from certain modules within an engine control system may be mapped to an axle torque request, which is then converted to an engine torque request based on various transmission and axle ratios. In some implementations, transmission gear ratio information may not be secured. As such, a given axle torque request may be converted into a corresponding engine torque request that is too large for a current gear ratio. For example, a driver axle torque request of 500 Nm corresponds to an engine torque request of 50 Nm in a gear ratio of 10 (e.g. $1^{st}$ gear). If the gear ratio is changed to 1 (e.g. in software due to a single point measurement failure) while the actual physical gear ratio remains at 10, the resulting engine torque request would be 500 Nm. An engine torque output of 500 Nm multiplied by the physical gear ratio of 10 would result in an axle torque of 5000 Nm, significantly greater than the driver axle torque request of 500 Nm.

Accordingly, certain driver-side torque requests may be implemented (e.g. mapped) as engine torque requests. After the initial request is generated as an engine torque request, the engine torque request is converted to an axle torque request based on a desired ratio conversion. The axle torque arbitration module 302 receives the resulting axle torque request, and the axle torque request is converted back to an engine torque request according to the same desired ratio conversion.

Figure 3:
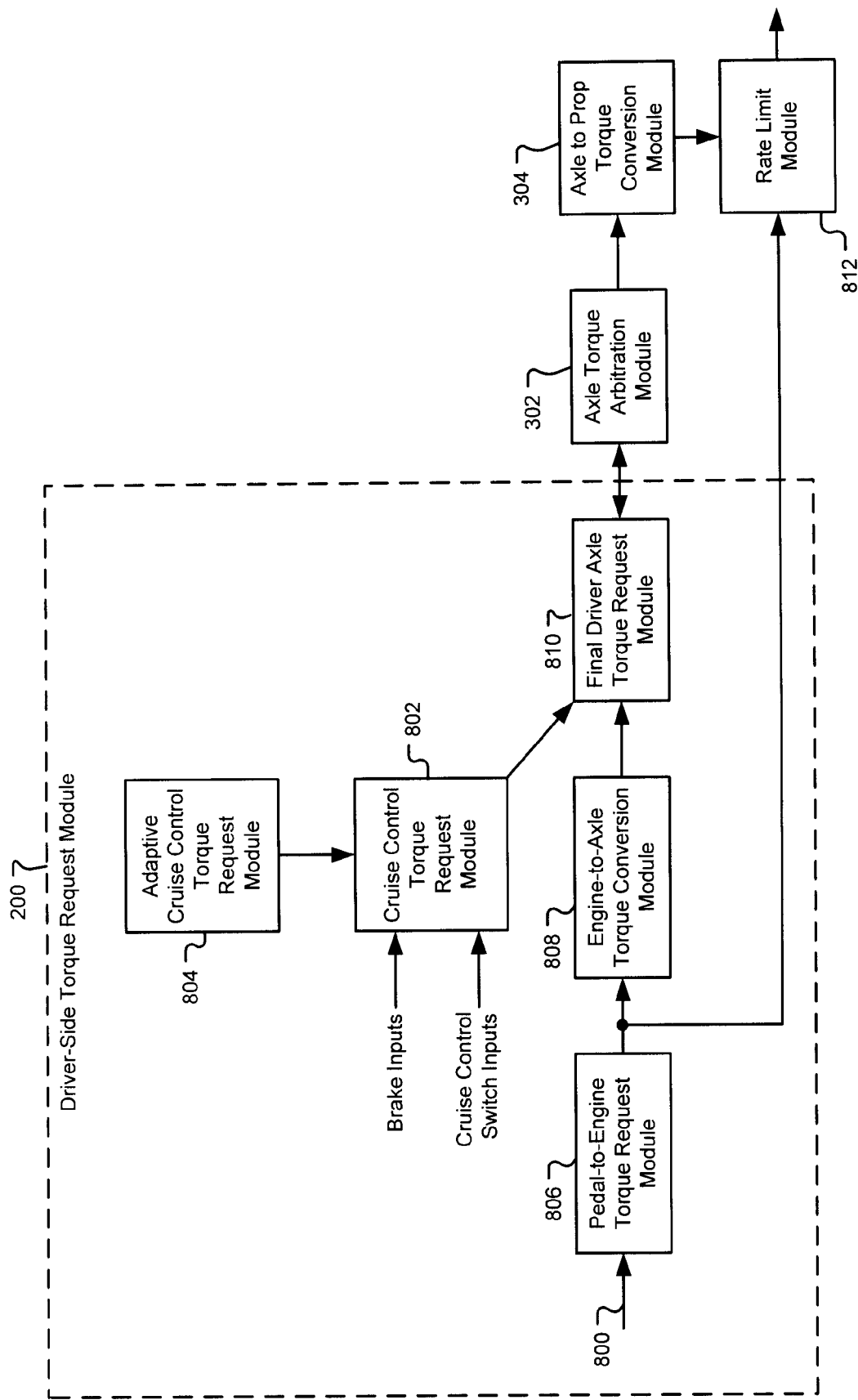
FIG. 3 is a functional block diagram of a driver-side torque request module according to the present disclosure.

Referring now to FIG. 3, the driver-side torque request module 200 is shown in more detail. A pedal position signal 800 represents a vehicle acceleration requested by the vehicle operator. The pedal position signal 800 may be generated by the pedal position sensor 46.

A cruise control torque request module 802 generates a cruise control torque request based on various inputs including, but not limited to, cruise control switch and brake inputs. The cruise control torque request represents an axle torque that is needed to maintain the vehicle at the set speed indicated via the interface module 48. An adaptive cruise control torque request module 804 may communicate with cruise control torque request module 802 to modify the cruise control torque request based on the environment surrounding the vehicle. For example, adaptive cruise control torque request module 804 may request that the axle torque be reduced so that the vehicle decelerates and/or maintains at least a minimum following distance behind a second vehicle while the cruise control is active. An actual following distance can be indicated by the signal from adaptive cruise control sensor 50.

A pedal-to-engine torque request module 806 receives the pedal position signal 800 and generates a pedal engine torque request signal accordingly. For example, the pedal-to-engine torque request module 806 may map a pedal position to a corresponding engine torque request. An engine-to-axle torque conversion module 808 receives the pedal engine torque request signal and converts the pedal engine torque request to a pedal axle torque request. For example, the engine-to-axle torque conversion module 808 may store transmission and axle ratios.

A final driver axle torque request module 810 receives the pedal axle torque request and the cruise control torque request and generates a final driver-side axle torque request accordingly. As described above with respect to FIGS. 2A and 2B, the axle torque arbitration module 302 generates a net axle torque request based on the torque requests and/or limits and communicates the net axle torque request to the axle-to-propulsion (i.e. axle torque to engine torque) torque conversion module 304.

In certain situations, the cruise control torque request may be larger than the pedal torque request. A rate limit module 812 may limit the final engine torque request according to the pedal engine torque request and output a final torque request accordingly. For example, the rate limit module 812 may limit the final engine torque request based on a torque change that corresponds to the pedal engine torque request. Ultimately, an amount of change of the final engine torque request output from the rate limit module 812 may be limited to an amount of change corresponding to the pedal engine torque request. As such, even if the cruise control torque request is larger than the pedal engine torque request, the rate limit module 812 may limit the resulting change in the requested torque to that requested by the pedal position signal 800.

The rate limit module 812 may further include a torque security rate limit offset. For example, the torque security rate limit offset may include, but is not limited to, a calibrated value and/or a dynamically calculated value based on other conditions such as gear, vehicle speed, and engine speed. The torque security rate limit offset may add to or subtract from the amount of change corresponding to the pedal engine torque request. In other words, the rate limit module 812 may further adjust any rate limit according to both the amount of change corresponding to the pedal engine torque request and the torque security rate limit offset.

Consequently, any rate limit enforced by the rate limit module 812 increases and decreases according to the pedal engine torque request. As such, the rate limit module 812 does not limit driver initiated pedal engine torque requests themselves, and instead only limits torque requests above the pedal engine torque request. For example, in a situation where the driver is not actuating the accelerator pedal and the pedal engine torque request is constant, any torque requests from the cruise control torque request module 802 may be limited at the rate limit module 812.

Further, the rate limit module 812 may selectively not limit the final engine torque request to the pedal engine torque request when the axle torque arbitration module 302 selects a requestor other than the driver-side torque request module 200. For example, the rate limit module 812 may not limit the final engine torque request when the axle torque arbitration module 302 selects one of the axle torque request modules 300.

Figure 4:
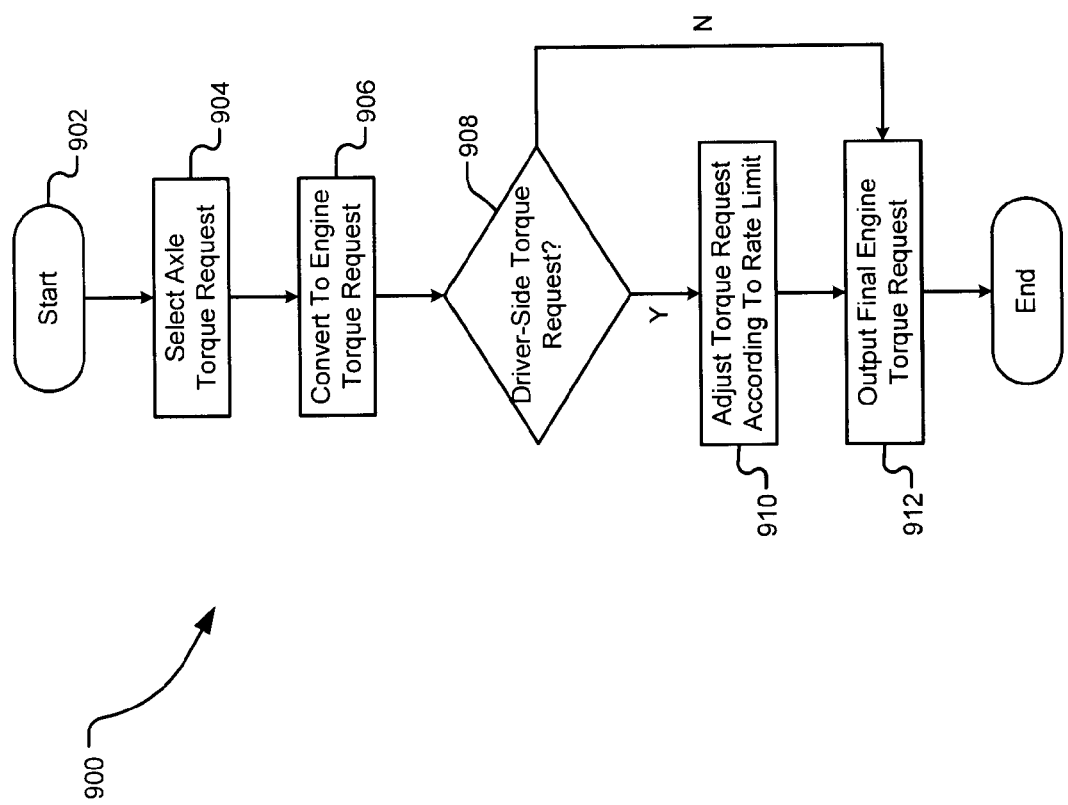
FIG. 4 is a flow diagram that illustrates steps of a rate limited axle torque method according to the present disclosure.

Referring now to FIG. 4, a method 900 for determining a rate limited axle torque request begins in step 902. In step 904, the method 900 selects one of a plurality of axle torque requests. In step 906, the method 900 converts the axle torque request to an engine torque request. In step 908, the method 900 determines whether the selected one of the plurality of axle torque requests corresponds to a driver-side torque request. If true, the method 900 continues to step 910. If false, the method 900 continues to step 912.

In step 910, the method 900 adjusts the engine torque request according to at least one of the pedal engine torque request and a torque security rate limit offset. In step 912, the method 900 outputs the final engine torque request.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An axle torque control system comprising:
an axle torque request module that receives an axle torque request and that selectively outputs the axle torque request, wherein the axle torque request is based on a cruise control torque request;
an axle torque conversion module that receives the axle torque request and that converts the axle torque request to an engine torque request; and
a rate limit module that
receives the engine torque request and a pedal engine torque request,
adjusts a rate limit based on an amount of change of the pedal engine torque request, and
applies the rate limit to the engine torque request when the cruise control torque request is greater than the pedal engine torque request.

2. The axle torque control system of claim 1 further comprising a pedal-to-engine torque request module that receives a pedal position and that generates the pedal engine torque request based on the pedal position.

3. The axle torque control system of claim 2 further comprising an engine-to-axle torque conversion module that receives the pedal engine torque request and that converts the pedal engine torque request to the axle torque request.

4. The axle torque control system of claim 1 further comprising a cruise control torque request module that generates the cruise control torque request.

5. The axle torque control system of claim 1 wherein the rate limit module applies the rate limit to the engine torque request in response to a determination that the engine torque request is a driver-side torque request.

6. The axle torque control system of claim 1 wherein the rate limit is adjusted further based on a torque security rate limit offset.

7. The axle torque control system of claim 6 wherein the rate limit corresponds to the amount of change of the pedal engine torque request plus or minus the torque security rate limit offset.

8. A method for operating an axle torque control system of a vehicle, the method comprising:
using the axle torque control system of the vehicle:
receiving an axle torque request, wherein the axle torque request is based on a cruise control torque request;
selectively outputting the axle torque request;

converting the axle torque request to an engine torque request;

adjusting a rate limit based on an amount of change of a pedal engine torque request; and applying the rate limit to the engine torque request when the cruise control torque request is greater than the pedal engine torque request.

9. The method of claim 8 further comprising:
receiving a pedal position; and
generating the pedal engine torque request based on the pedal position.

10. The method of claim 9 further comprising converting the pedal engine torque request to the axle torque request.

11. The method of claim 8 further comprising applying the rate limit to the engine torque request in response to a determination that the engine torque request is a driver-side torque request.

12. The method of claim 8 wherein the rate limit is further adjusted based on a torque security rate limit offset.

13. The method of claim 12 wherein the rate limit corresponds to the amount of change of the pedal engine torque request plus or minus the torque security rate limit offset.

* * * * *